United States Patent
Yoshimoto et al.

(10) Patent No.: US 11,626,611 B2
(45) Date of Patent: Apr. 11, 2023

(54) GRIPPING DEVICE

(71) Applicant: HONDA MOTOR CO., LTD., Tokyo (JP)

(72) Inventors: Hitoe Yoshimoto, Tochigi-ken (JP); Takuma Nagai, Tochigi-ken (JP); Daisuke Koga, Tochigi-ken (JP); Toshiaki Tezuka, Tochigi-ken (JP); Moka Shida, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 426 days.

(21) Appl. No.: 16/827,748

(22) Filed: Mar. 24, 2020

(65) Prior Publication Data
US 2020/0313221 A1 Oct. 1, 2020

(30) Foreign Application Priority Data
Mar. 27, 2019 (JP) ............................ JP2019-060374

(51) Int. Cl.
*H01M 10/04* (2006.01)
*B25J 15/00* (2006.01)

(52) U.S. Cl.
CPC ....... *H01M 10/0404* (2013.01); *B25J 15/009* (2013.01); *B25J 15/0047* (2013.01); *H01M 2220/20* (2013.01)

(58) Field of Classification Search
CPC .......... H01M 10/0404; H01M 2220/20; B25J 15/0047; B25J 15/009; B65G 47/90; Y02E 60/10; Y02P 70/50; B23P 19/007; B23P 19/06
See application file for complete search history.

(56) References Cited

U.S. PATENT DOCUMENTS

| | | | | |
|---|---|---|---|---|
| 2,025,363 A | * | 12/1935 | Taylor | H01M 10/4285 439/627 |
| 2,295,768 A | * | 9/1942 | Williamson | H01M 50/256 294/903 |
| 2,613,982 A | * | 10/1952 | Gottstein | H01M 50/256 294/903 |
| 2,926,801 A | * | 3/1960 | Fouse | B65G 47/904 414/733 |

(Continued)

FOREIGN PATENT DOCUMENTS

| | | | | |
|---|---|---|---|---|
| CN | 108417879 A | * | 8/2018 | ........ H01M 10/0404 |
| JP | 50-095760 | | 8/1975 | |

(Continued)

OTHER PUBLICATIONS

Chinese Office Action for Chinese Patent Application No. 202010231917.8 dated Jul. 19, 2021.

(Continued)

*Primary Examiner* — Stephen A Vu
(74) *Attorney, Agent, or Firm* — Amin, Turocy & Watson, LLP

(57) ABSTRACT

A gripping device includes a side supporting unit supporting or releasing a side of a workpiece, a plurality of pusher members pushing the workpiece downward, and a pusher member shifting unit shifting the pusher members in a direction toward or away from the workpiece. An engaging pin to be engaged with a through-hole created in the workpiece is disposed inside at least one of the pusher members.

11 Claims, 6 Drawing Sheets

(56) References Cited

U.S. PATENT DOCUMENTS

2003/0223916 A1    12/2003  Testrut et al.

FOREIGN PATENT DOCUMENTS

| JP | 01-187192 | 7/1989 |
| JP | 3905060 | 4/2007 |
| JP | 2010-201517 | 9/2010 |
| JP | 4784159 | 10/2011 |

OTHER PUBLICATIONS

Japanese Office Action for Japanese Patent Application No. 2019-060374 dated Aug. 2, 2022.

* cited by examiner

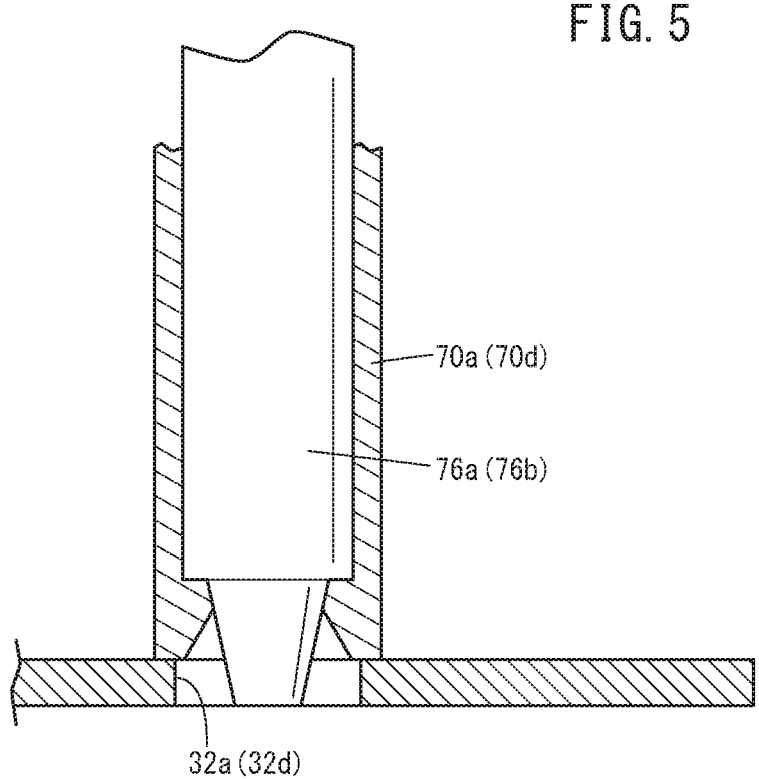

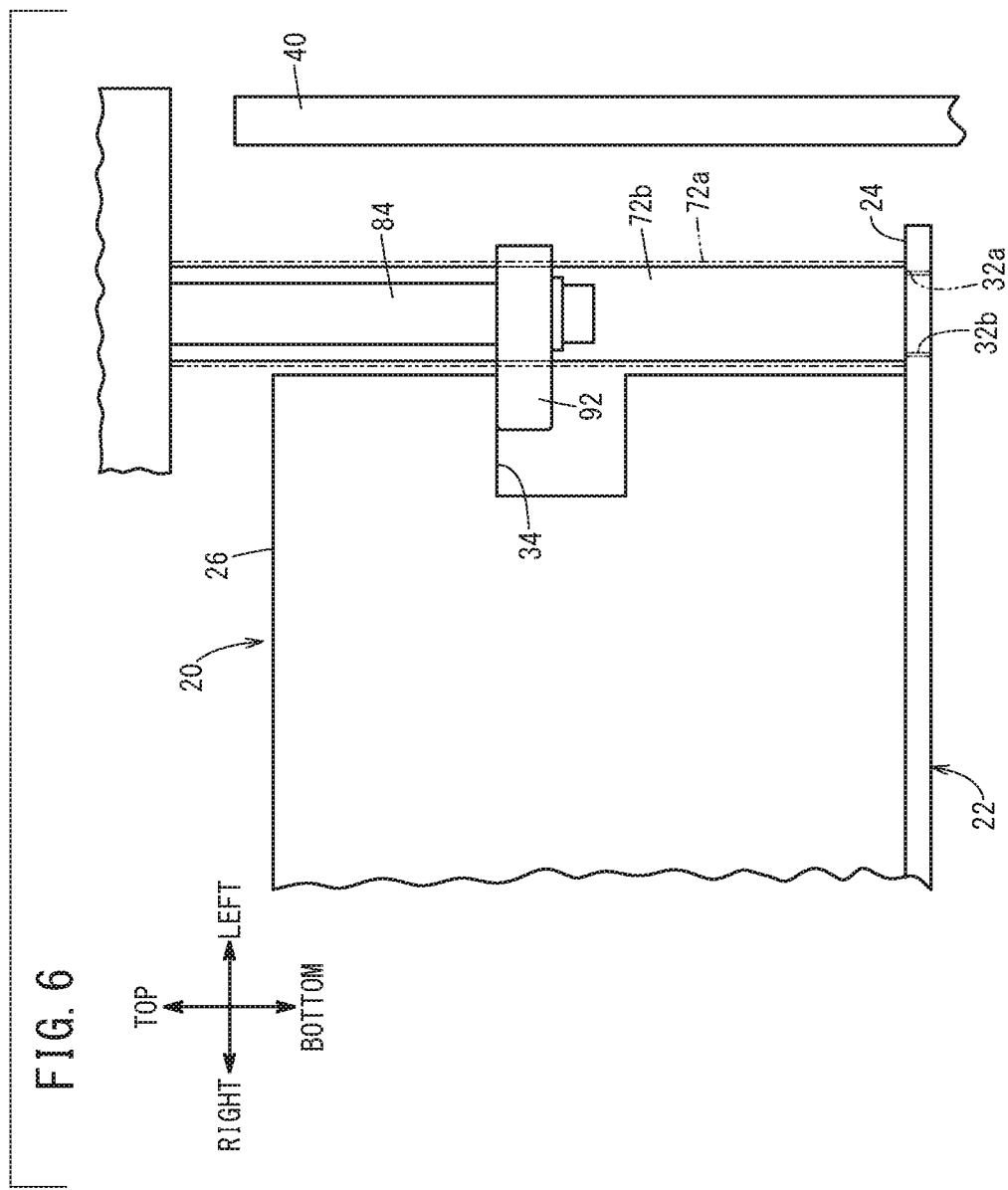

GRIPPING DEVICE

CROSS-REFERENCE TO RELATED APPLICATION

This application is based upon and claims the benefit of priority from Japanese Patent Application No. 2019-060374 filed on Mar. 27, 2019, the contents of which are incorporated herein by reference.

BACKGROUND OF THE INVENTION

Field of the Invention

The present invention relates to gripping devices gripping workpieces to be carried.

Description of the Related Art

A high-voltage battery installed in an electric vehicle is made of, for example, a plurality of battery modules stored in a casing. In this case, a plurality of stud bolts are disposed on the base of the casing to extend upward to the interior of the casing. On the other hand, bolt insertion holes through which the stud bolts are put are bored in the battery modules. To store the battery modules in the casing, each of the battery modules is carried to above the casing and then lowered so that the stud bolts are put through the bolt insertion holes.

Then, nuts are screwed onto the stud bolts through the action of a nut runner. This secures the battery module to the interior of the casing at a predetermined position.

To carry various types of workpieces including the above-described battery modules to predetermined points, a carrying mechanism is usually used. The carrying mechanism is provided with a gripping device attached thereto, and the workpieces are carried through the action of the carrying mechanism while being held by the gripping device. Known gripping devices of this type are described, for example, in Japanese Patent Nos. 3905060 and 4784159.

SUMMARY OF THE INVENTION

In a case of a high-voltage battery installed in a small electric vehicle, the casing also needs to be small. Since a small casing has a small internal capacity, it is assumed that the clearance between two adjacent battery modules and the clearances between the battery modules and the inner walls of the casing are considerably small when the battery modules are stored in the casing.

The gripping device usually includes two chuck jaws separated from each other to be opened or approaching each other to be closed. The workpieces are held when the chuck jaws are closed, and are released when the chuck jaws are opened. However, in the case where the clearances are small, there may be insufficient space for the chuck jaws to be opened (displaced in a direction separated from each other) after the battery modules are stored in the casing.

A principal object of the present invention is to provide a gripping device allowing members for positioning a workpiece to easily retract from the workpiece even when there is insufficient space.

According to an aspect of the present invention, a gripping device provided for a carrying mechanism and configured to hold a workpiece carried by the carrying mechanism comprises a side supporting unit configured to support or release a side of the workpiece, a plurality of pusher members configured to push the workpiece downward, a pusher member shifting unit configured to shift the pusher members in a direction toward or away from the workpiece, and an engaging pin disposed inside at least one of the pusher members, and configured to be engaged with a through-hole formed in the workpiece.

According to the present invention, the engaging pin that engages with the through-hole to position the workpiece is disposed inside the pusher member to be reciprocable. That is, the engaging pin is coaxial with the pusher member pushing the workpiece downward. Thus, to separate the engaging pin from the through-hole, the engaging pin may be moved upward together with the pusher member in an integrated manner. That is, in this case, the engaging pin does not need to be moved in the horizontal direction.

The engaging pin can be moved up and down even in a small space. Thus, the engaging pin can be separated from the workpiece even when the clearance between two adjacent workpieces is small. That is, the engaging pin can be easily retracted from the workpiece even when there is insufficient space.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a front view of a principal part illustrating a state in which an engaging pin protruding from the lower end of a pusher member engages with a bolt insertion hole; and FIG. 6 is a schematic rear view of a principal part, viewed from the rear, illustrating a state in which a left gripping claw constituting the left side gripping unit supports the left side of the battery module.

DESCRIPTION OF THE PREFERRED EMBODIMENTS

Figure 1:
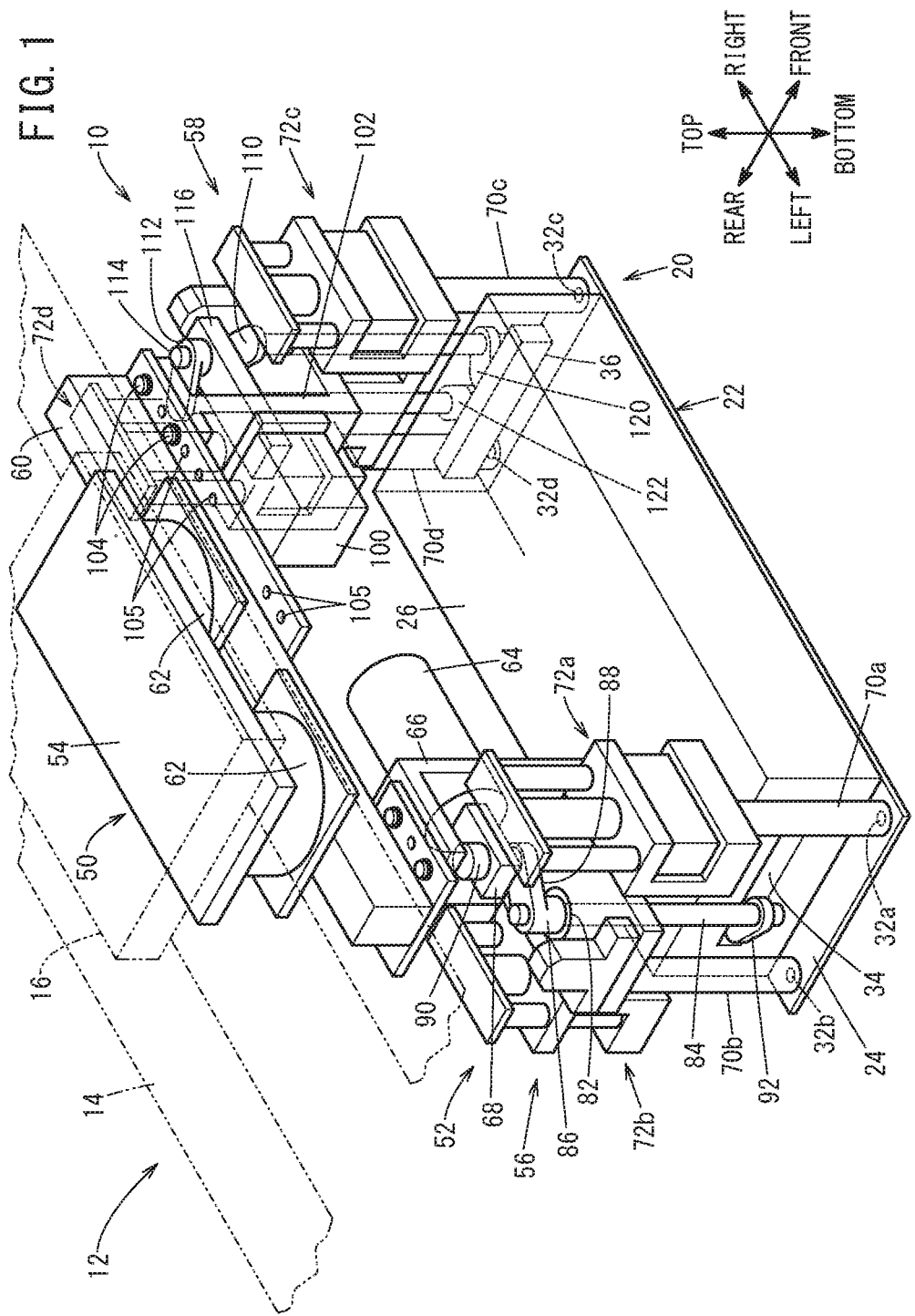
FIG. 1 is a schematic perspective view of a principal part of a gripping device according to an embodiment of the present invention.

A preferred embodiment of a gripping device according to the present invention will be described in detail below with reference to the accompanying drawings. In the below, terms such as "left", "right", "front", and "rear" indicate those illustrated in the drawings. However, these terms are used to simplify the explanation for ease of understanding and do not specify the left and right when the gripping device is in practical use.

A gripping device 10 according to this embodiment is provided for a carrying mechanism 12 indicated by virtual lines in FIG. 1. That is, the carrying mechanism 12 includes a horizontal linear guide 14 extending in the left-right direction and a horizontal movement slider 16 displaced according to the guidance of the horizontal linear guide 14.

The gripping device 10 is connected to the horizontal movement slider 16. Thus, the gripping device 10 is displaced along the horizontal linear guide 14 together with the horizontal movement slider 16 in an integrated manner.

The horizontal linear guide 14 is provided for an elevation slider (not illustrated) moving up and down along a vertical linear guide (not illustrated). Thus, the gripping device 10 can also move up and down together with the elevation slider in an integrated manner.

The gripping device 10 can hold, for example, a battery module 20 as a workpiece. A brief summary of the battery module 20 will now be described with reference to FIG. 2. The battery module 20 includes a substantially rectangular parallelepiped casing 22. The casing 22 includes a bottom plate 24 and a top plate 26. The bottom plate 24 is longer than the top plate 26 and thus includes portions protruding from the top plate 26 in the left-right direction. That is, when the casing 22 is viewed in plan, the left end portion and the right end portion of the bottom plate 24, in other words, the four corner portions are exposed from a left end edge portion and a right end edge portion of the top plate 26.

A first bolt insertion hole 32a to a fourth bolt insertion hole 32d respectively receiving a first stud bolt 30a to a fourth stud bolt 30d are bored through the bottom plate 24 at the four corner portions. That is, all the first bolt insertion hole 32a to the fourth bolt insertion hole 32d are throughholes. As is clear from the above, when the casing 22 is viewed in plan, the first bolt insertion hole 32a to the fourth bolt insertion hole 32d can be visually recognized since the first bolt insertion hole 32a to the fourth bolt insertion hole 32d are not blocked by the top plate 26.

Figure 2:
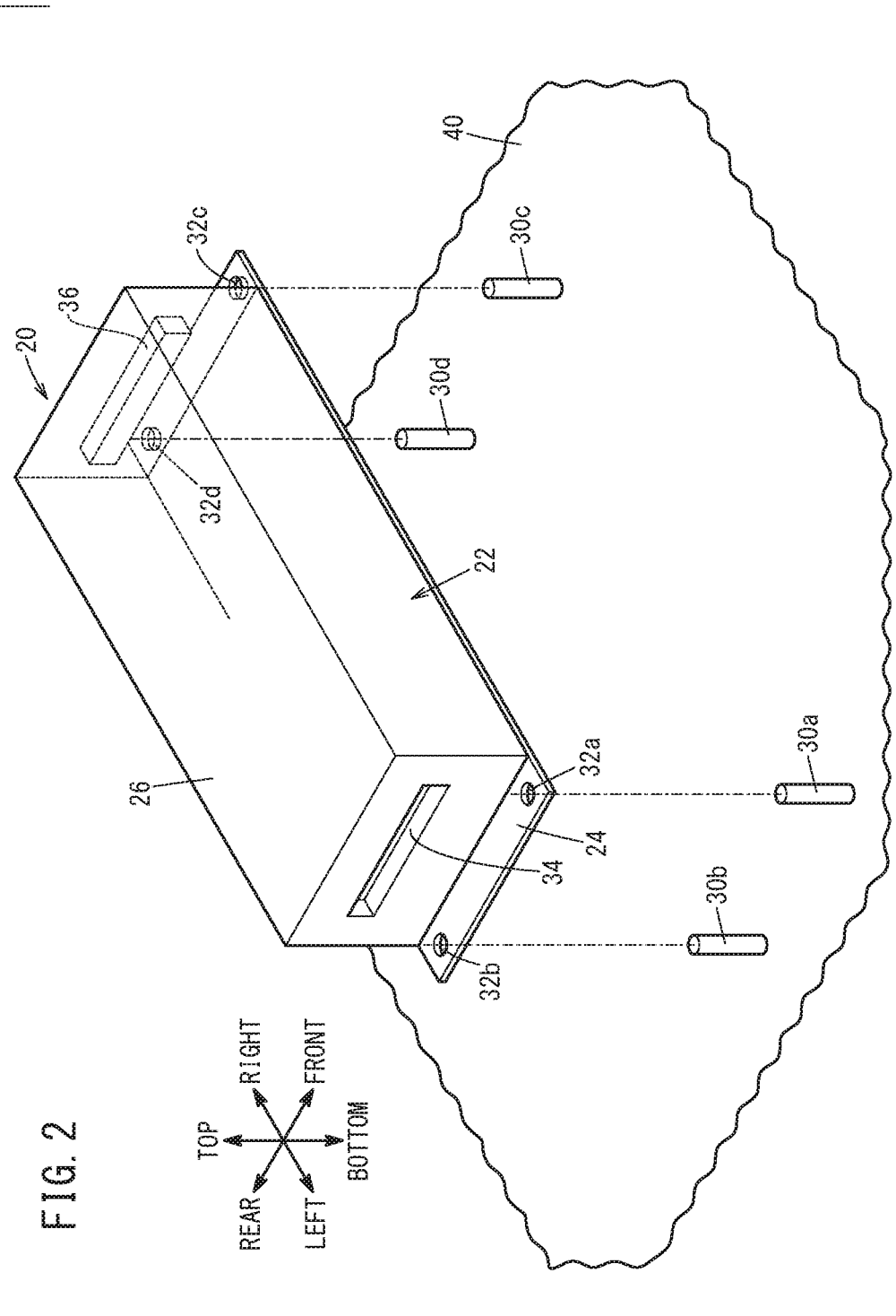
FIG. 2 is a schematic perspective view of a principal part illustrating a battery module serving as a workpiece carried by the gripping device and a battery case storing the battery module.
Figure 3:
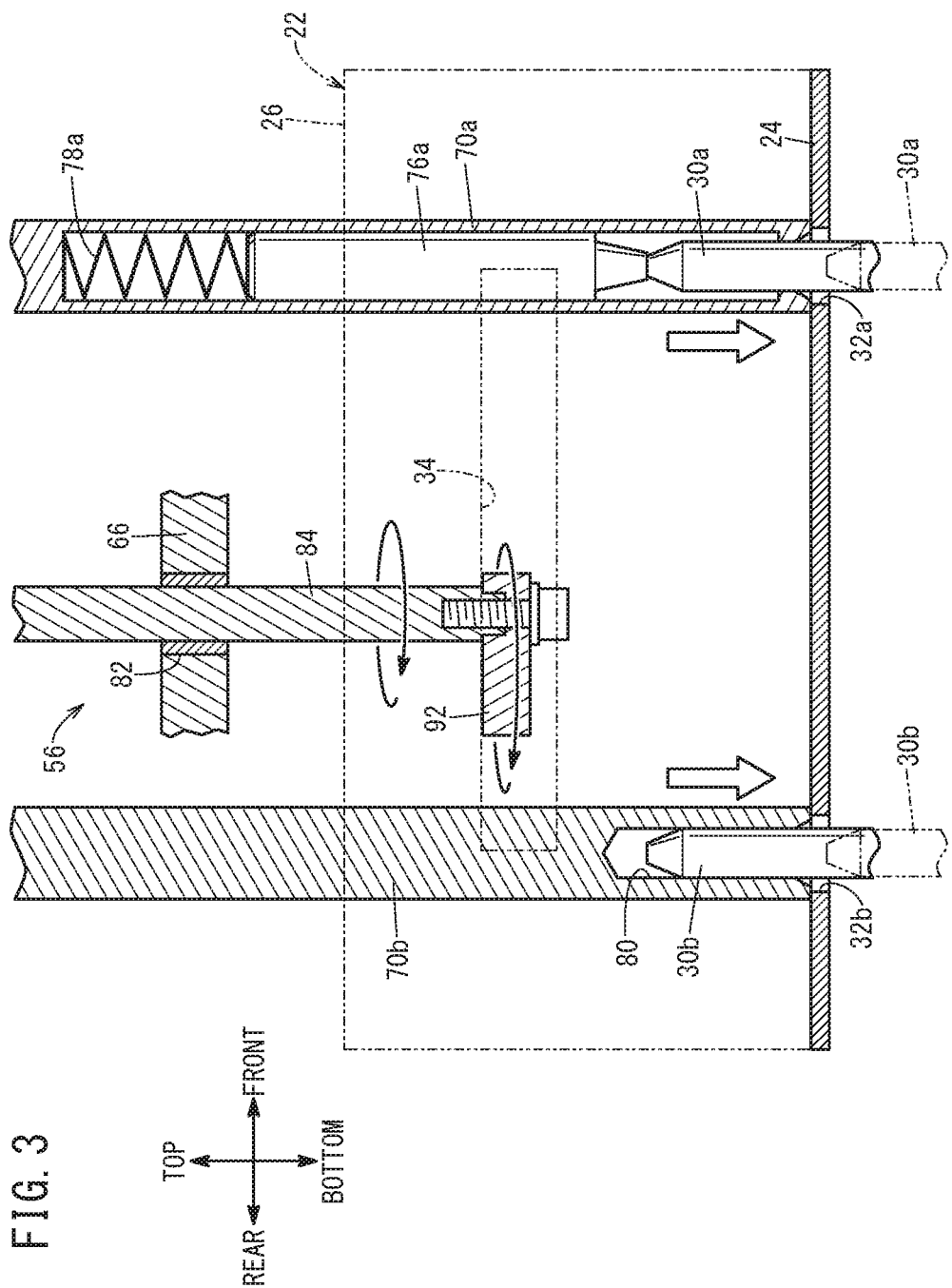
FIG. 3 is a schematic longitudinal sectional view of a principal part of a left side gripping unit constituting the gripping device.
Figure 4:
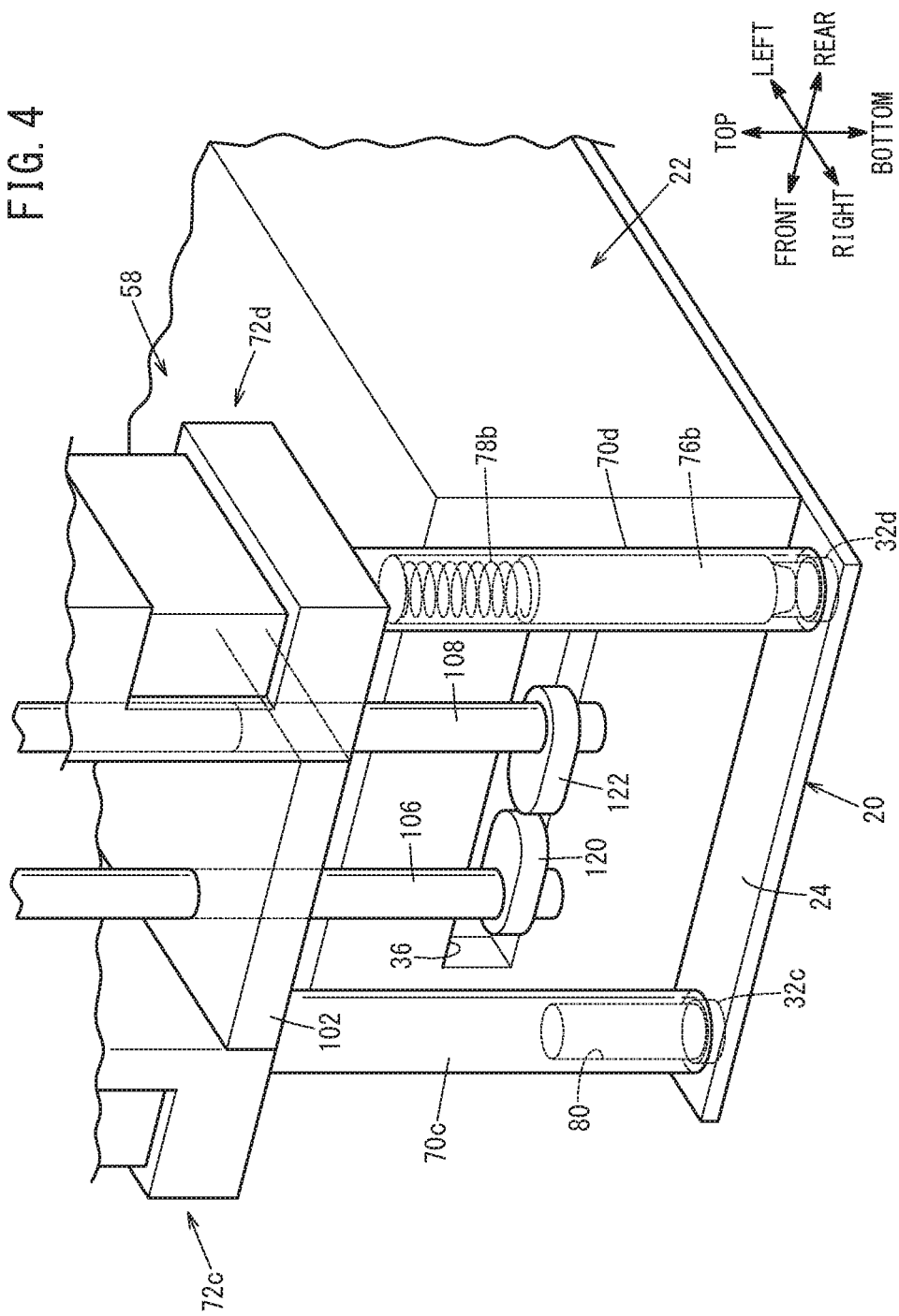
FIG. 4 is a schematic perspective view of a principal part of a right side gripping unit constituting the gripping device.

Moreover, as illustrated in FIGS. 2 to 4, a left recess 34 is formed on the left side of the casing 22, and a right recess 36 is formed on the right side. As described below, the gripping device 10 grips (holds) the casing 22, that is, the battery module 20, using the left recess 34 and the right recess 36.

A plurality of cells are electrically connected to each other inside the casing 22. The battery module 20 configured as above is electrically connected inside a battery case 40 (see FIG. 2) to constitute a high-voltage battery producing high-voltage power.

Next, the gripping device 10 will be described. The gripping device 10 includes a suspended portion 50 suspended on the horizontal movement slider 16 (see FIG. 1) and a gripping portion 52 held by the horizontal movement slider 16 via the suspended portion 50.

The suspended portion 50 includes a connector plate 54 connected to the horizontal movement slider 16 and a long, horizontally disposed holding bar 60 (holding member) for holding a left side gripping unit 56 and a right side gripping unit 58 on the connector plate 54. The left side gripping unit 56 and the right side gripping unit 58 are side supporting units constituting the gripping portion 52. In addition, floating bearings 62 are disposed between the holding bar 60 and the connector plate 54.

A substantially L-shaped left bracket 66 holding a left air cylinder 64 is supported by the holding bar 60 at the left end of the holding bar 60. The left air cylinder 64 constitutes the left side gripping unit 56. A left reciprocating rod 68 of the left air cylinder 64 is fitted in a left rod pass-through hole formed in the left bracket 66 to be reciprocable. Moreover, a first air cylinder 72a for elevation (pusher member shifting unit) configured to hoist and lower a first pusher member 70a is disposed on the front face of the left bracket 66, and a second air cylinder 72b for elevation (pusher member shifting unit) configured to hoist and lower a second pusher member 70b is disposed on the rear face of the left bracket 66.

As illustrated in FIG. 3, the first pusher member 70a has a hollow body and is connected to a short length of rod (not illustrated) of the first air cylinder 72a. Consequently, the first pusher member 70a moves up and down together with the rod in an integrated manner through the action of the first air cylinder 72a. The lower end face of the first pusher member 70a faces the first bolt insertion hole 32a.

A first engaging pin 76a and a first coil spring 78a are fitted in the hollow interior of the first pusher member 70a. The first engaging pin 76a is elastically biased downward by the first coil spring 78a, and thereby the lower end of the first engaging pin 76a is normally exposed from the lower end of the first pusher member 70a as illustrated in FIG. 5. The first coil spring 78a (see FIG. 3) shrinks when the first engaging pin 76a is pushed from below. As the first coil spring 78a shrinks, the first engaging pin 76a moves upward to be entirely stored in the first pusher member 70a.

A short length of rod (not illustrated) of the second air cylinder 72b engages with the upper end of the second pusher member 70b. Consequently, the second pusher member 70b moves up and down together with the rod in an integrated manner through the action of the second air cylinder 72b. The lower end face of the second pusher member 70b faces the second bolt insertion hole 32b. In addition, the second pusher member 70b has an engagement hole 80 with a bottom in the lower end. The body of the second pusher member 70b is solid above the engagement hole 80.

The left bracket 66 is provided with a left bearing 82 at a position between the first air cylinder 72a and the second air cylinder 72b. A left rotating rod 84 for gripping is put through the left bearing 82 to be rotatable. Furthermore, a left rotating arm member 86 is disposed on the upper end of the left rotating rod 84 (see FIG. 1). The left rotating arm member 86 includes an arm portion 88, and the front end of the arm portion 88 is connected to the left reciprocating rod 68 of the left air cylinder 64 via a left connecting rod 90. In this manner, the axis center of the left rotating rod 84 is set at a position offset from the left reciprocating rod 68.

A left gripping claw 92 serving as a claw member is held by the left rotating rod 84 at the lower end of the left rotating rod 84 (see FIG. 3). The left reciprocating rod 68 of the left air cylinder 64 is normally retracted to a returned position. At this time, the longitudinal end of the left gripping claw 92 faces backward. In contrast, when the left reciprocating rod 68 advances, the left gripping claw 92 pivots about 90°, and the longitudinal end faces the right.

On the other hand, a substantially L-shaped right bracket 102 holding a right air cylinder 100 is supported by the holding bar 60 at the right end of the holding bar 60 via mounting bolts 104 (see FIG. 1). The right air cylinder 100 constitutes the right side gripping unit 58. Here, a plurality of bolt holes 105 receiving the mounting bolts 104 are formed in the right end of the holding bar 60 in the longitudinal direction. Thus, the position of the right side gripping unit 58 can be changed as appropriate by putting the mounting bolts 104 through the different bolt holes 105.

A right reciprocating rod 116 of the right air cylinder 100 is put through a right rod pass-through hole formed in the right bracket 102 to be reciprocable. Moreover, a third air cylinder 72c for elevation (pusher member shifting unit) configured to hoist and lower a third pusher member 70c is disposed on the front face of the right bracket 102, and a fourth air cylinder 72d for elevation (pusher member shifting unit) configured to hoist and lower a fourth pusher member 70*d* is disposed on the rear face of the right bracket 102. The third air cylinder 72*c* has a structure similar to that of the second air cylinder 72*b*, and the third pusher member 70*c* has a structure similar to that of the second pusher member 70*b*. Moreover, the fourth air cylinder 72*d* has a structure similar to that of the first air cylinder 72*a*, and the fourth pusher member 70*d* has a structure similar to that of the first pusher member 70*a*.

That is, a second engaging pin 76*b* and a second coil spring 78*b* are fitted in the hollow interior of the fourth pusher member 70*d*, and the second engaging pin 76*b* is elastically biased downward by the second coil spring 78*b*. Thus, the lower end of the second engaging pin 76*b* is normally exposed from the lower end of the fourth pusher member 70*d*. Similarly to the above, the second coil spring 78*b* shrinks when the second engaging pin 76*b* is pushed from below, and as a result, the second engaging pin 76*b* moves upward to be entirely stored in the fourth pusher member 70*d*.

As described above, the first engaging pin 76*a* (first pusher member 70*a*) and the second engaging pin 76*b* (fourth pusher member 70*d*) are disposed at positions diagonally opposite to each other. Similarly, the second pusher member 70*b* and the third pusher member 70*c* are disposed at positions diagonally opposite to each other. The lower end face of the third pusher member 70*c* faces the third bolt insertion hole 32*c*, and the lower end face of the fourth pusher member 70*d* faces the fourth bolt insertion hole 32*d*.

The right bracket 102 is provided with a right front bearing and a right rear bearing at positions between the third air cylinder 72*c* and the fourth air cylinder 72*d*. A right front rotating rod 106 for gripping is put through the right front bearing to be rotatable, and a right rear rotating rod 108 for gripping is put through the right rear bearing to be rotatable (see FIG. 4). Furthermore, the rear end of a right front rotating arm member 110 disposed on the upper end of the right front rotating rod 106 and the front end of a right rear rotating arm member 112 disposed on the upper end of the right rear rotating rod 108 are connected to the right reciprocating rod 116 of the right air cylinder 100 via a right connecting rod 114 (see FIG. 1).

In this manner, the axis centers of the right front rotating rod 106 and the right rear rotating rod 108 are set at positions offset from the right reciprocating rod 116. In this case, when the right side gripping unit 58 is viewed from the right side, the rear end of the right front rotating arm member 110 is below the front end of the right rear rotating arm member 112.

A right front gripping claw 120 serving as a claw member is held by the right front rotating rod 106 at the lower end of the right front rotating rod 106, and a right rear gripping claw 122 serving as a claw member is held by the right rear rotating rod 108 at the lower end of the right rear rotating rod 108 (see FIG. 4). When the right reciprocating rod 116 of the right air cylinder 100 is retracted to an advanced position, the longitudinal end of the right front gripping claw 120 and the longitudinal end of the right rear gripping claw 122 face each other. In contrast, when the right reciprocating rod 116 moves back, the right front gripping claw 120 and the right rear gripping claw 122 pivot about 90°, and the longitudinal ends face the left.

The gripping device 10 according to this embodiment is basically configured as above. Next, the operational effects thereof will be described.

The gripping device 10 is displaced together with the horizontal movement slider 16 in an integrated manner along the horizontal linear guide 14 to hold the battery module 20 stored in a storage cabinet. When the gripping device 10 is disposed above the battery module 20, the horizontal movement slider 16 and the gripping device 10 stop.

Next, the elevation slider moves downward along the vertical linear guide. Consequently, the gripping device 10 moves downward and approaches the battery module 20.

Next, the first air cylinder 72*a* to the fourth air cylinder 72*d* are energized in a synchronized manner. This causes the first pusher member 70*a* to the fourth pusher member 70*d* to be lowered toward the first bolt insertion hole 32*a* to the fourth bolt insertion hole 32*d*, respectively. At this time, since the first engaging pin 76*a* and the second engaging pin 76*b* are elastically biased by the first coil spring 78*a* and the second coil spring 78*b*, respectively, the lower end of the first engaging pin 76*a* stored inside the first pusher member 70*a* is exposed from the lower end of the first pusher member 70*a*, and the lower end of the second engaging pin 76*b* stored inside the fourth pusher member 70*d* is exposed from the lower end of the fourth pusher member 70*d* (see FIG. 5).

Consequently, when the lower ends of the first pusher member 70*a* to the fourth pusher member 70*d* are seated on the bottom plate 24 of the casing 22, the first engaging pin 76*a* engages with the first bolt insertion hole 32*a*, and the second engaging pin 76*b* engages with the fourth bolt insertion hole 32*d* (see FIG. 5). In this state, the first pusher member 70*a* to the fourth pusher member 70*d* push the bottom plate 24 of the casing 22. In this manner, the battery module 20 is pushed at all the four corner portions while two of the four corner portions diagonally opposite to each other are held by the first engaging pin 76*a* and the second engaging pin 76*b*.

Due to individual differences such as production errors, the position of the second engaging pin 76*b* may not match the position of the fourth bolt insertion hole 32*d* even when the position of the first engaging pin 76*a* matches the position of the first bolt insertion hole 32*a*. To deal with this, the suspended portion 50 includes the floating bearings 62 in this embodiment. The floating bearings 62 can be shaken or moved side to side and back and forth in FIG. 1 to shake or move the gripping portion 52. Thus, when the second engaging pin 76*b* does not engage with the fourth bolt insertion hole 32*d* while the first engaging pin 76*a* engages with the first bolt insertion hole 32*a*, the gripping portion 52 is shaken or moved so that the second engaging pin 76*b* is aligned with and engaged with the fourth bolt insertion hole 32*d* for engagement between the second engaging pin 76*b* and the fourth bolt insertion hole 32*d*.

In this manner, in this embodiment, the gripping device 10 is supported in a floating manner with respect to the carrying mechanism 12 (the horizontal linear guide 14 and the horizontal movement slider 16) due to the suspended portion 50 including the floating bearings 62. Thus, the gripping device 10 can be shaken or moved so that the first engaging pin 76*a* is aligned with the first bolt insertion hole 32*a* and that the second engaging pin 76*b* is aligned with the fourth bolt insertion hole 32*d*. That is, the first engaging pin 76*a* can be engaged with the first bolt insertion hole 32*a*, and the second engaging pin 76*b* can be engaged with the fourth bolt insertion hole 32*d*.

Next, the left reciprocating rod 68 of the left air cylinder 64 advances to the left. This causes the arm portion 88 of the left rotating arm member 86 to pivot clockwise, and thereby the left rotating rod 84 rotates clockwise together with the pivoting arm portion 88 in an integrated manner. Consequently, the left gripping claw 92 supported at the lower end of the left rotating rod 84 rotates about 90° clockwise, and the end of the left gripping claw 92 enters inside the left recess 34 as illustrated in FIG. 6.

At the same time, the right reciprocating rod 116 of the right air cylinder 100 moves back to the left. This causes the right front rotating arm member 110 to pivot counterclockwise and the right rear rotating arm member 112 to pivot clockwise. Consequently, the right front rotating rod 106 and the right front gripping claw 120 rotate about 90° counterclockwise, and the right rear rotating rod 108 and the right rear gripping claw 122 rotate about 90° clockwise. As a result, the end of the right front gripping claw 120 and the end of the right rear gripping claw 122 enter inside the right recess 36.

The battery module 20 is gripped from the left side by the entry of the end of the left gripping claw 92 into the inside of the left recess 34 and from the right side by the entry of the ends of the right front gripping claw 120 and the right rear gripping claw 122 into the inside of the right recess 36 in this manner. The grip mentioned above together with the engagement between the first engaging pin 76a and the first bolt insertion hole 32a and between the second engaging pin 76b and the fourth bolt insertion hole 32d, enables the battery module 20 to be held by the gripping device 10.

In this state, the horizontal linear guide 14 moves upward together with the elevation slider provided for the vertical linear guide (not illustrated) in an integrated manner. Furthermore, the horizontal movement slider 16 is displaced in the left-right direction as appropriate to carry the battery module 20 to above the battery case 40 (see FIG. 2). While the battery module 20 is carried, the four corner portions of the bottom plate 24 are pushed downward by the first pusher member 70a to the fourth pusher member 70d. Due to the push, the position of the battery module 20 is stabilized. Thus, the grip on the battery module 20 can be prevented from becoming unstable.

When the battery module 20 is disposed above the battery case 40, the horizontal movement slider 16 stops. Furthermore, as the elevation slider moves downward along the vertical linear guide, the battery module 20 moves downward to the battery case 40 together with the elevation slider in a integrated manner.

A plurality of stud bolts are disposed on the base of the battery case 40 such that the body portions extend upward to the interior of the battery case 40. As described above, the stud bolts are the first stud bolt 30a to the fourth stud bolt 30d respectively put through the first bolt insertion hole 32a to the fourth bolt insertion hole 32d.

Similarly to the above, for example, the position of the fourth bolt insertion hole 32d may not match the position of the fourth stud bolt 30d even when the position of the first bolt insertion hole 32a matches the position of the first stud bolt 30a. Also in this case, the floating bearings 62 are shaken or moved side to side and back and forth in FIG. 1 to shake or move the gripping portion 52. As a result, the second stud bolt 30b to the fourth stud bolt 30d are respectively aligned with the second bolt insertion hole 32b to the fourth bolt insertion hole 32d, and the first stud bolt 30a to the fourth stud bolt 30d are respectively put through the first bolt insertion hole 32a to the fourth bolt insertion hole 32d.

The second stud bolt 30b enters the engagement hole 80 of the second pusher member 70b, and the third stud bolt 30c enters the engagement hole 80 of the third pusher member 70c. On the other hand, the first stud bolt 30a enters the hollow interior of the first pusher member 70a while pushing the first engaging pin 76a, and the fourth stud bolt 30d enters the hollow interior of the fourth pusher member 70d while pushing the second engaging pin 76b. With this, the first engaging pin 76a retracts into the hollow interior of the first pusher member 70a, and the second engaging pin 76b retracts into the hollow interior of the fourth pusher member 70d (see FIG. 3). At the same time, the first coil spring 78a and the second coil spring 78b are compressed. In this manner, since the first engaging pin 76a and the second engaging pin 76b retract, the first engaging pin 76a does not prevent the entry of the first stud bolt 30a into the hollow interior of the first pusher member 70a, and the second engaging pin 76b does not prevent the entry of the fourth stud bolt 30d into the hollow interior of the fourth pusher member 70d.

The first stud bolt 30a to the fourth stud bolt 30d are respectively put through the first bolt insertion hole 32a to the fourth bolt insertion hole 32d, and thereby the battery module 20 is positioned inside the battery case 40. Subsequently, the first air cylinder 72a to the fourth air cylinder 72d are energized in a synchronized manner, and thereby the first pusher member 70a to the fourth pusher member 70d move upward to be separated from the first bolt insertion hole 32a to the fourth bolt insertion hole 32d, respectively.

In this manner, the first engaging pin 76a that engages with the first bolt insertion hole 32a to position the battery module 20 serving as a workpiece is disposed inside the first pusher member 70a to be reciprocable, and the second engaging pin 76b that engages with the fourth bolt insertion hole 32d to position the battery module 20 is disposed inside the fourth pusher member 70d to be reciprocable. Thus, the first engaging pin 76a is coaxial with the first pusher member 70a, and the second engaging pin 76b is coaxial with the fourth pusher member 70d. Thus, to separate the first engaging pin 76a and the second engaging pin 76b from the first bolt insertion hole 32a and the fourth bolt insertion hole 32d, respectively, the first engaging pin 76a and the second engaging pin 76b may be moved upward together with the first pusher member 70a and the fourth pusher member 70d, respectively, in an integrated manner as described above. That is, in this case, the first engaging pin 76a and the second engaging pin 76b do not need to be moved in the left-right direction (horizontal direction).

Moreover, substantially at the same time, the left gripping claw 92, the right front gripping claw 120, and the right rear gripping claw 122 constituting the gripping portion 52 release the battery module 20. Specifically, the left reciprocating rod 68 of the left air cylinder 64 moves back to the right. This causes the arm portion 88 of the left rotating arm member 86 to pivot counterclockwise, and thereby the left rotating rod 84 and the left gripping claw 92 rotate about 90° counterclockwise together with the pivoting arm portion 88 in an integrated manner. As a result, the end of the left gripping claw 92 retracts from inside the left recess 34.

On the other hand, the right reciprocating rod 116 of the right air cylinder 100 advances to the right. This causes the right front rotating arm member 110 to pivot clockwise and the right rear rotating arm member 112 to pivot counterclockwise. Following the pivoting, the right front rotating rod 106 and the right front gripping claw 120 rotate about 90° clockwise, and the right rear rotating rod 108 and the right rear gripping claw 122 rotate about 90° counterclockwise. As a result, the end of the right front gripping claw 120 and the end of the right rear gripping claw 122 retract from inside the right recess 36 (see FIGS. 3 and 4). In this manner, the battery module 20 is released from the restraint by the gripping device 10.

As described above, the left gripping claw 92 rotates during supporting or releasing of the left side of the battery module 20 in the left side gripping unit 56, and the right front gripping claw 120 and the right rear gripping claw 122 rotate about 90° during supporting or releasing of the right side of the battery module 20 in the right side gripping unit 58. Such rotations are acceptable even in a small space. In addition, in this embodiment, the left rotating rod 84 and the right rotating rods (the right front rotating rod 106 and the right rear rotating rod 108) are not displaced to approach or to be separated from each other. Thus, the left rotating rod 84, the right front rotating rod 106, and the right rear rotating rod 108 do not need any space to retract.

That is, in this embodiment, the battery module 20 can be released from the restraint by separating the first engaging pin 76a and the second engaging pin 76b from the first bolt insertion hole 32a and the fourth bolt insertion hole 32d, respectively, and by rotating the left gripping claw 92, the right front gripping claw 120, and the right rear gripping claw 122. Consequently, the battery module 20 can be released from the restraint even when, for example, the clearance between two adjacent battery modules 20 and the clearances between the battery module 20 and the inner walls of the casing 22 are small.

After releasing the battery module 20, the gripping device 10 moves upward to be separated from the battery case 40 as the elevation slider moves upward. In the first pusher member 70a, the first stud bolt 30a is detached from the hollow interior, and the first coil spring 78a extends and elastically biases the first engaging pin 76a. In the fourth pusher member 70d, the fourth stud bolt 30d is detached from the hollow interior, and the second coil spring 78b extends and elastically biases the second engaging pin 76b. As a result, the lower end of the first engaging pin 76a is exposed from the lower end of the first pusher member 70a again, and the lower end of the second engaging pin 76b is exposed from the lower end of the fourth pusher member 70d again.

Subsequently, nuts are screwed onto the first stud bolt 30a to the fourth stud bolt 30d using a nut runner (not illustrated). This secures the battery module 20 to the battery case 40 at a predetermined position.

To grip other battery modules with different longitudinal dimensions, the position of the right side gripping unit 58 may be changed. That is, to grip a short length of battery module, the right side gripping unit 58 is moved to the left and secured using the mounting bolts 104. To grip a long length of battery module, the right side gripping unit 58 is moved to the right and secured using the mounting bolts 104. Since the position of the right side gripping unit 58 can be changed in this manner, battery modules with various dimensions can be gripped. That is, the gripping device 10 is highly adaptable.

The present invention is not limited in particular to the embodiment described above, and various modifications can be made thereto without departing from the gist of the present invention.

For example, both the left side gripping unit 56 and the right side gripping unit 58 may have one gripping claw or two gripping claws.

Moreover, all the first pusher member 70a to the fourth pusher member 70d may be provided with an engaging pin.

Furthermore, the workpiece carried by the gripping device 10 is not limited to the battery module 20 as a matter of course.

What is claimed is:

1. A gripping device provided for a carrying mechanism and configured to hold a workpiece carried by the carrying mechanism, comprising:
    a side supporting unit configured to support or release a side of the workpiece;
    a plurality of pusher members configured to push the workpiece downward;
    a pusher member shifting unit configured to shift the pusher members in a direction toward or away from the workpiece; and
    an engaging pin disposed inside at least one of the pusher members, and configured to be engaged with a through-hole formed in the workpiece, wherein
    the side supporting unit includes a claw member configured to approach or be separated from the workpiece, and
    a point at which the claw member supports the workpiece is above points at which the pusher members push the workpiece.

2. The gripping device according to claim 1, wherein the engaging pin is reciprocable inside the pusher member and retractably engages with the through-hole.

3. The gripping device according to claim 1, wherein the pusher members push a base of the workpiece.

4. The gripping device according to claim 1, further comprising:
    a suspended portion configured to support the gripping device in a floating manner with respect to the carrying mechanism,
    wherein the gripping device supported in the floating manner with respect to the carrying mechanism is configured to be moved horizontally by the suspended portion.

5. The gripping device according to claim 4, wherein the suspended portion includes a floating bearing.

6. The gripping device according to claim 1, wherein the side supporting unit is held in a manner that a position of the side supporting unit is configured to be changed with respect to a holding member.

7. A gripping device provided for a carrying mechanism and configured to hold a workpiece carried by the carrying mechanism, comprising:
    a side supporting unit configured to support or release a side of the workpiece;
    a plurality of pusher members configured to push the workpiece downward;
    a pusher member shifting unit configured to shift the pusher members in a direction toward or away from the workpiece;
    an engaging pin disposed inside at least one of the pusher members, and configured to be engaged with a through-hole formed in the workpiece; and
    a suspended portion configured to support the gripping device in a floating manner with respect to the carrying mechanism,
    wherein the gripping device supported in the floating manner with respect to the carrying mechanism is configured to be moved horizontally by the suspended portion.

8. The gripping device according to claim 7, wherein the engaging pin is reciprocable inside the pusher member and retractably engages with the through-hole.

9. The gripping device according to claim 7, wherein the pusher members push a base of the workpiece.

10. The gripping device according to claim 7, wherein the suspended portion includes a floating bearing.

11. The gripping device according to claim 7, wherein the side supporting unit is held in a manner that a position of the side supporting unit is configured to be changed with respect to a holding member.

\* \* \* \* \*